United States Patent [19]

Kunikiyo et al.

[11] Patent Number: 5,425,926
[45] Date of Patent: Jun. 20, 1995

[54] PROCESS OF COATING MOLDED ARTICLE OF OLEFINIC RESIN

[75] Inventors: Takumi Kunikiyo; Ryoichi Ohki; Mitsutoshi Shimizu; Kazuhiko Yamauchi, all of Hamamatsu; Ryuichi Ohki, Ichihara; Koki Hirano, Ichihara; Toshihide Nara, Ichihara, all of Japan

[73] Assignees: Suzuki Motor Corporation, Hamamatsu; Idemitsu Petrochemical Co., Ltd., Tokyo, both of Japan

[21] Appl. No.: 263,717

[22] Filed: Jun. 22, 1994

[30] Foreign Application Priority Data

Jun. 22, 1993 [JP] Japan .................. 5-150296

[51] Int. Cl.⁶ .............................................. B05D 3/02
[52] U.S. Cl. .................. 427/393.5; 428/483; 428/516; 428/523
[58] Field of Search .............. 427/393.5; 428/483, 428/516, 523

[56] References Cited

U.S. PATENT DOCUMENTS

| | | | |
|---|---|---|---|
| 5,185,188 | 2/1993 | Abe et al. | 427/393.5 X |
| 5,266,362 | 11/1993 | Katoh et al. | 427/393.5 X |
| 5,273,789 | 12/1993 | Shinonaga et al. | 427/393.5 X |
| 5,288,520 | 2/1994 | Toyoshima et al. | 427/393.5 X |

Primary Examiner—Michael Lusignan
Attorney, Agent, or Firm—Oblon, Spivak, McClelland, Maier, & Neustadt

[57] ABSTRACT

In the process of coating a molded article of an olefinic resin, a finishing coating layer is formed on the surface of the molded article of an olefinic resin prepared by mixing a resin composition containing (E) polypropylene and (F) an ethylene-α-olefin copolymer with (G) a modified polyolefin in which a specific group is introduced, (H) stearic acid monoglyceride or stearyl diethanolamine, and (I) an inorganic filler, with a coating material prepared by mixing the main material containing a copolymer obtained by copolymerization of (A) a chlorinated polyolefin, (B) an acrylic monomer having hydroxyl group, and (C) a polyester prepolymer as the main component thereof with (D) a multi-functional polyisocyanate compound as the curing agent in a single coating process without pretreatment of the surface of the molded article using an organic solvent containing a halogen and without coating the surface of the molded article with a primer as undercoat.

7 Claims, 1 Drawing Sheet

PROCESS OF COATING MOLDED ARTICLE OF OLEFINIC RESIN

BACKGROUND OF THE INVENTION

1. Field of the Invention

The present invention relates to a process of coating a molded article of an olefinic resin. More particularly, it relates to a process of coating a molded article of an olefinic resin which process is capable of forming a finishing coating layer in a single coating process without washing the surface of the molded article and without coating the surface of the molded article with a primer as undercoat.

2. Description of the Related Arts

For automobile bumpers, protective strips and the like, compositions containing polypropylene (PP) and ethylene-propylene rubber (EPR) have heretofore been used as materials. Polypropylene has very inferior property for coating because it has no polar group in the molecule and is chemically inert. For coating of a bumper made of such a composition, degreasing and etching treatment with trichloroethane or the like is indispensable. This situation is not limited to coating of automobile bumpers. For coating of an article made of a polypropylenic composite material, it is the general practice that the article is processed with pretreatment of etching with trichloroethane to obtain practical coating strength (refer to Shosaku Yamamoto and Mikio Uchida, Jitsumu Hyomen Gijutsu, Vol. 31, Number 10, Page 440 (1984)).

However, trichloroethane causes environmental destruction, such as ozonosphere destruction., and thus, a method using trichloroethane in coating must be avoided.

As materials to replace trichloroethane, surface active agents in the form of alkaline aqueous solutions can be mentioned. However, these surface active agents show low washing and dissolving ability when they are applied to PP and cannot be used for coating of an article made of a polypropylenic composite material, such as the composition described above and the like.

Because of the situation described above, the coating property of molded articles of olefinic resins like polypropylene has been improved both with respect to the coating material and with respect to the resin composition.

As the improvement with respect to the coating material, resins or coating materials having good adhesion to the surface of molded articles of olefinic resins are disclosed. Examples of such resins and coating materials are a mixture of a chlorinated olefinic resin and acrylic resin (Japanese Patent Application Laid-Open No. Showa 62(1987)-200438), a resin system in which an isocyanate compound is used in combination with a copolymer of a chlorinated olefinic resin and acrylic monomer (Japanese Patent Application Laid-Open No. Showa 62(1987)-27968), and the like.

On the other hand, as the improvement with respect to the resin composition, methods of improving the coating property by blending polar substances with PP have been reported. Examples of such methods are a method utilizing a composition prepared by adding polyvinylphenol to a PP resin (Japanese Patent Application Laid-Open No. Heisei 3(1991)9941), a method utilizing a composition prepared by adding a copolymer of ethylene and carboxylic acid compound to a PP resin (Japanese Patent Application Laid-Open No. Heisei 3(1991)-278862), and the like.

However, these coating materials and compositions of olefinic resins do not always have sufficient adhesion of the coated layer when molded articles prepared by using these materials are coated without washing the surface or after washing the surface with a watery system. Stability, solvent resistance, weatherability, and the like of the coating material are not satisfactory, either. These materials have another drawback that the total cost is increased because a new kind of washing process or an expensive primer specific for the material is required.

Furthermore, application of these disclosed technologies are all limited to articles which do not require coating with higher adhesion or good weatherability, such as automobile interior parts, home electric appliances, and the like. These technologies cannot realize coating of automobile exterior parts, such as a bumper and the like, in a single coating process without washing of the surface and without coating of the surface with a primer as undercoat.

Therefore, it has been desired by the automobile industry that a coating material or an olefinic resin composition which enables formation of a coating layer on a substrate directly without washing and finishing of the coating in a single process or within several processes be developed.

SUMMARY OF THE INVENTION

Accordingly, in response to the desire of the industry described above, an object of the present invention is to provide a process of coating a molded article of an olefinic resin which process is capable of forming a finishing coating layer directly on the surface of the molded articles in a single finishing process without washing the surface of the molded articles.

Extensive studies were undertaken by the present inventors to eliminate the drawbacks of the conventional technologies and to achieve the object described above.

As the result of the above studies, a coating material which exhibits the coating property without using a primer as undercoat and by washing the surface to be coated with vapor of 1,1,1-trichloroethane alone for conditioning the surface before the coating, was successfully developed by using a specific copolymer as the coating material. Furthermore, an olefinic resin composition which can exhibit the coating property by using the coating material described above without conditioning the surface (such as washing with vapor of 1,1,1-trichloroethane) before the coating, was successfully developed by using an olefinic resin prepared by mixing polypropylene with a specific elastomer and a modified polyolefin having a specific group introduced in it. It has been discovered that the above object can be achieved by these developments. The present invention has been completed on the basis of the discovery.

Thus, the process of coating a molded article of an olefinic resin comprises forming a finishing coating layer on the surface of a molded article of an olefinic resin comprising components (E), (F), (G), (H) and (I) with a coating material prepared by mixing the main material containing a copolymer obtained by copolymerization of components (A), (B) and (C) and having a hydroxyl value of 20 to 150 as the main component thereof with a component (D) as the curing agent in a single coating process without washing the surface of the molded article and without coating the surface of the molded article with a primer as undercoat.

Therein, aforementioned components (A) to (I) are:
(A) a chlorinated polyolefin in an amount of 5 to 50% by weight of the copolymer;
(B) an acrylic monomer having hydroxyl group or a mixture thereof with an ethylenic monomer copolymerizable therewith in an amount of 5 to 80% by weight of the copolymer;
(C) a polyester prepolymer having ethylenic double bonds at the ends thereof and a number-average molecular weight of 500 to 3,000 in an amount of 1 to 50% by weight of the copolymer;
(D) a multi-functional isocyanate compound in such an amount that the equivalent ratio of the NCO group to the OH group in the copolymer (NCO-/OH) obtained from the components (A), (B) and (C) is 0.4 to 2.0;
(E) a polypropylene in an amount of 50 to 90% by weight of the total of the components (E) and (F);
(F) an ethylene-α-olefin copolymer elastomer comprising:
(a) an ethylene-α-olefin copolymer elastomer containing 15 to 50% by weight of an α-olefin and having a Mooney viscosity [ML 1+4 (100° C.)] of 10 to 100 in an amount of 100 to 20% by weight of the component (F), and
(b) an ethylene-α-olefin copolymer elastomer containing 50 to 80% by weight of an α-olefin and having a Mooney viscosity [ML 1+4 (100° C.)] of 20 to 80 in an amount of 0 to 80% by weight of the component (F), in an amount of 50 to 10% by weight of the total of the components (E) and (F);
(G) a modified polyolefin comprising linear polyethylene or linear polypropylene having 5 to 15% by weight of a group represented by the formula:

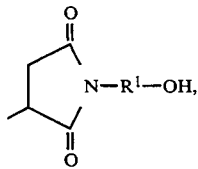

wherein $R^1$ indicates an alkylene group having 1 to 4 carbon atoms, introduced at one or both ends of the molecular chain, in an amount of 1 to 15 parts by weight based on 100 parts by weight of the total of the components (E) and (F);
(H) a compound represented by one of the general formulae (I) and (II):

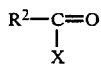

wherein $R^2$ indicates a linear alkyl group having 10 to 22 carbon atoms and X indicates the following group:

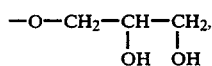

in an amount of 0.01 to 2 parts by weight based on 100 parts by weight of the total of the components (E) and (F); and
(I) an inorganic filler in an amount of 0 to 15 parts by weight based on 100 parts by weight of the total of the components (E) and (F); respectively.

Other and further objects, features and advantages of the invention will appear more fully from the following description.

BRIEF DESCRIPTION OF THE DRAWING

In FIG. 2, I shows the case of excellent recoating property in which no peeling is found (point 1). II shows the case of inferior recoating property in which peeling is found (point 6).

Figure 1:
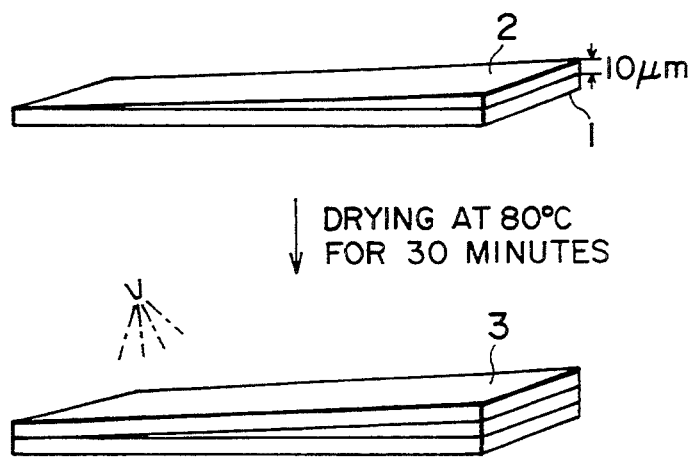
FIG. 1 is a schematic view showing the process of coating in the test of the recoating property.

Numbers in the figures have the following meaning:
1: a substrate
2: the first coating layer
3: the second coating layer

DESCRIPTION OF PREFERRED EMBODIMENTS

The present invention is described in more detail in the following.

The coating material used in the process of coating according to the present invention is a two-component coating material prepared by mixing the main material containing a copolymer obtained by copolymerization of the components (A), (B) and (C) [hereinafter, sometimes referred to as the copolymer (J) or the resin (J)] as the main component thereof with the component (D) as the curing agent.

The chlorinated polyolefin of the component (A) used in the copolymer constituting the main component of the main material in the coating material according to the present invention is, for example, a chlorination product of a polymer synthesized from at least one olefin such as ethylene and propylene. It may also be a conventional chlorinated polyolefin which is prepared by modifying a polymer synthesized from at least one of ethylene, propylene, butadiene, and the like, by introduction of carboxyl group, followed by chlorination.

The chlorinated polyolefin generally has a chlorine content of 10 to 50% by weight, preferably 15 to 40% by weight, and a number average molecular weight of 3,000 to 100,000, preferably 5,000 to 50,000. When the chlorine content is less than 10% by weight, particularly stability of a solution at low temperatures is poor and affinity with the acrylic resin obtained by polymerizing the component (B) is inferior. These phenomena causes inferior appearance of the coating layer formed and the chlorine content in this range is not preferable. When the chlorine content is more than 50% by weight, adhesion of the coating layer to the surface of the molded article of the olefinic resin and weatherability are poor and the chlorine content in this range is not preferable either.

When the number average molecular weight is less than 3,000, solvent resistance, hardness or adhesion is inferior. When the number average molecular weight is more than 100,000, a larger amount of a diluting solvent is required because of excessively high viscosity of the coating material and solid content of the coating material during the coating process cannot be increased.

Thus, increase in thickness of the coating layer is difficult and workability of the coating is inferior. Therefore, a number average molecular weight out of the specified range is not preferable.

The component (B) used in the copolymer constituting the main component of the main material in the coating material is an acrylic monomer having hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, or the like. An addition product of one of these compounds with ε-caprolactone, Praxel FM Monomer (a product of Daicel Kagaku Kogyo Co., Ltd.), Praxel FA Monomer (a product of Daicel Kagaku Kogyo Co., Ltd.), or the like may be used as well.

As the ethylenic monomer copolymerizable with the acrylic monomer having hydroxyl group which is used as a mixture with the acrylic monomer, vinyl monomers and various kinds of other compounds can be used. Examples of the ethylenic monomer include methyl (meth)acrylate, ethyl (meth)acrylate, propyl (meth)acrylate, butyl (meth)acrylate, 2-ethylhexyl (meth)acrylate, lauryl (meth)acrylate, cyclohexyl (meth)acrylate, glycidyl (meth)acrylate, (meth)acrylic acid, styrene, p-tert-butylstyrene, vinyltoluene, vinyl acetate and (meth)acrylates modified with acyl group.

The component (C) used in the copolymer constituting the main component of the main material in the coating material is a polyester prepolymer having ethylenic double bonds at the ends thereof. It remarkably improves dispersion of pigments into the copolymer obtained by copolymerization with the components (A) and (B) described above, leading to remarkable improvement of appearance of the coating layer formed.

The component (C) is a compound obtained by esterification of a polybasic acid and a polyhydric alcohol, followed by bringing the obtained polyester having hydroxyl groups at the ends into reaction with an ethylenically unsaturated ! monomer having isocyanate group or an acid anhydride having a double bond typified by maleic anhydride in an amount of 0.2 to 0.5 equivalent of the latter compound per 1 equivalent of the hydroxyl group of the polyester.

Number average molecular weight of the component (C) is generally 500 to 3,000, preferably 700 to 2,000. When the number average molecular weight is less than 500, a coating layer having good appearance cannot be expected. When the number average molecular weight is more than 3,000, solvent resistance of the coating layer is decreased and there arises danger of gellation during the polymerization process of the resin (J). Thus, a number average molecular weight out of the specified range is not preferable.

The polybasic acid used in the component (C) is a polybasic acid generally used in the preparation of polyesters, such as phthalic anhydride, isophthalic acid, tetrahydrophthalic anhydride, hexahydrophthalic anhydride, trimellitic anhydride, pyromellitic anhydride, tetrachlorophthalic anhydride, terephthalic acid, adipic acid, azelaic acid, sebacic acid, succinic acid, 1,4-cyclohexanedicarboxylic acid, or the like. The polybasic acid may be used singly or as a mixture of two or more kinds.

The polyhydric alcohol used in the component (C) is, for example, a dihydric alcohol, such as ethylene glycol, propylene glycol, diethylene glycol, tripropylene glycol, butanediol, pentanediol, hexanediol, neopentyl glycol, hexylene glycol, an ethylene oxide adduct of bisphenol A, a propylene oxide adduct of bisphenol A, an ethylene oxide adduct of hydrogenated bisphenol A, a propylene oxide adduct of hydrogenated bisphenol A, or the like; glycerol; trimethylolethane; trimethylolpropane; hexanetriol; pentaerythritol; 1,4-cyclohexyldimethanol; or the like. The polyhydric alcohol may be used singly or as a mixture of two or more kinds.

The preferably usable ethylenically unsaturated monomer having isocyanate group in the component (C) is exemplified by but not limited to methacryloyl isocyanate, 2-isocyanatoethyl methacrylate and misopropenyl-α,α-dimethylbenzyl isocyanate.

The coating material used in the present invention comprises the main material containing the copolymer of the components (A), (B) and (C) described above as the main component thereof. The copolymer can be obtained by copolymerizing 5 to 50% by weight, preferably 10 to 40% by weight, of the component (A), 5 to 80% by weight, preferably 20 to 70% by weight, of the component (B) and 1 to 50% by weight, preferably 10 to 40% by weight, of the component (C). The copolymer has a hydroxyl value of 20 to 150.

When the amount of the component (A) is less than 5% by weight, adhesion is poor. When the amount of the component (A) is more than 50% by weight, solvent resistance and weatherability are decreased. When the amount of the component (B) is less than 5% by weight, solvent resistance, weatherability and water resistance are poor. When the amount of the component (B) is more than 80% by weight, the coating layer obtained is hard and lacking in flexibility. When the amount of the component (C) is less than 1% by weight, dispersion of pigment is decreased and appearance of the coating layer is poor. When the amount of the component (C) is more than 50% by weight, solvent resistance is decreased. Thus, amounts out of the specified ranges are not preferable.

When the hydroxyl value is lower than 20, crosslinking is insufficient and solvent resistance, weatherability and resistance against chemicals of the coating layer are decreased. When the hydroxyl value is higher than 150, gloss is decreased and a coating layer having good appearance cannot be obtained.

In the coating material of the present invention, the curing agent of the component (D) is mixed with the main material containing the copolymer described above as the main component. A multi-functional isocyanate compound is used as the curing agent of the component (D).

Examples of the multi-functional isocyanate compound include tolylene diisocyanate, diphenylmethane diisocyanate, isophorone diisocyanate (IPDI), hexamethylene diisocyanate (HDI), trimethylhexane diisocyanate, methylcyclohexane diisocyanate, methylenebis(cyclohexyl isocyanate), di(isocyanatomethyl)cyclohexane, addition products of one of these isocyanates with ethylene glycol, a polyester glycol, polypropylene glycol, a polyether polyol, polycaprolactone polyol, trimethylolethane, trimethylolpropane, hexanetriol, pentaerythritol, water, or the like, biuret compounds of these isocyanates and polymers of diisocyanates.

The coating material of the present invention is prepared by mixing the main material containing the copolymer obtained by copolymerization of the components (A), (B) and (C) and having a hydroxyl value of 20 to 150 as the main component thereof with the component (D) as the curing agent. In the preparation of the coating material, the curing agent is used in an amount relative to the amount of the copolymer such that the amount of the isocyanate group in the component (D) is 0.4 to 2.0 equivalent, preferably 0.6 to 1.5 equivalent, per 1 equivalent of the hydroxyl group in the copolymer. When the amount is less than 0.4 equivalent, physical properties and solvent resistance of the coating layer is decreased. When the amount is more than 2.0 equivalent, improvement in the properties is no more found in particular and the amount is just economically unfavorable. Thus, an amount out of the specified range is not preferable.

In the coating material of the present invention, the copolymer and the curing agent of the component (D) are required as the essential components thereof as described above. However, pigments, fillers, aluminum powder, pearl mica powder, other resins, organic solvents, additives, and the like may additionally be used according to necessity within the range such that the object of the present invention is not adversely affected.

The pigment used here is not particularly limited but an inorganic pigment, such as titanium oxide, carbon black, iron oxide and lead chromate, an organic pigment, such as phthalocyanine blue, phthalocyanine green and quinacridone red, may be used. Examples of the filler include kaolin, barium sulfate and calcium carbonate.

An organic solvent may be used within the range of allowable solubility of the copolymer. Specifically, an aromatic hydrocarbon, such as toluene, xylene and solvent naphtha; an ester, such as methyl acetate, ethyl acetate, butyl acetate and ethylene glycol acetate monomethyl ether; a ketone, such as acetone, methyl ethyl ketone and methyl isobutyl ketone; or the like solvent can be used. The solvent may be used singly or as a mixture of two or more kinds.

As the additive, additives generally used in a coating material, such as a surfacant, a surface conditioner and an anti-settling agent, may be used. A curing accelerator, such as zinc naphthenate, zinc octoate and dibutyltin laurate, may be used additionally.

In the present invention, the two-component coating material comprising the main material containing the copolymer and the curing agent of the component (D) as the essential components thereof is used as described above. For application of the coating, the main material containing the copolymer is mixed with the curing agent and other components used according to necessity to prepare the desired coating material, which is then served to application.

According to the present invention, the objective coated molded article of an olefinic resin can be obtained by forming a finishing coating layer with direct application of the coating material described above on the surface of the molded article of the olefinic resin without any pretreatment.

The material used for preparing the molded article of the olefinic resin comprises the components (E), (F), (G) and (H) described above. The component (I) may be added suitably depending on stiffness or shrinkage in molding required for the coated molded article of the object.

Polypropylene (PP) of the component (E) constituting the material of the molded article of the olefinic resin is not particularly limited but various kinds of polypropylene can be used. Preferable examples include isotactic propylene homopolymer having crystallinity, an ethylene-propylene random copolymer having a low content of ethylene unit, a propylene block copolymer composed of a homopolymer part which consists of propylene homopolymer and a copolymer part which consists of an ethylene-propylene random copolymer having a relatively large content of ethylene unit and a propylene-ethylene-$\alpha$-olefin copolymer in which an $\alpha$-olefin, such as butene-1, is additionally copolymerized in the homopolymer part or the copolymer part of the propylene block copolymer described above.

Melt index (MI) of PP is not particularly limited but preferably 0.5 to 100 g/10 minutes, more preferably 1 to 50 g/10 minutes.

Examples of the ethylene-$\alpha$-olefin copolymer elastomer of the component (F) include copolymers of ethylene and an $\alpha$-olefin, such as copolymers of ethylene and propylene, ethylene and 1-butene and ethylene and 1-hexene, and copolymers of these compounds with a non-conjugated diene.

Examples of the non-conjugated diene described above include dicyclopentadiene, 1,4-hexadiene, cyclooctadiene, dicyclooctadiene, methylnorbornene, 5-ethylidene-2-norbornene, 5-vinyl-2-norbornene, 5-methylene-2-norbornene, 5-methyl-1,4-hexadiene, and 7-methyl-1,6-octadiene.

In general, adhesion of a coating layer is obtained by adding an ethylene-$\alpha$-olefin copolymer elastomer to PP. This effect is exhibited because an organic solvent in the coating material, such as thinner, penetrates into the surface of a molded article of a resin to form a mixed layer containing the coating material and the resin forming the molded article. However, when the surface of the molded article is degreased with trichloroethane or the like and conditioning of the surface with the etching effect or the like is insufficient, penetration of the thinner into the molded article is significantly decreased and sufficient adhesion cannot be obtained.

Therefore, in the present invention, the specific ethylene-$\alpha$-olefin copolymer elastomer of the component (a) described above is used in the component (F).

The ethylene-$\alpha$-olefin copolymer elastomer of the component (a) is a copolymer containing 50 to 85% by weight, preferably 60 to 80% by weight, of the ethylene unit.

As the ethylene-$\alpha$-olefin copolymer elastomer, a copolymer having an initial modulus of elasticity (measured according to Japanese Industrial Standard K-630) of 400 kg/cm$^2$ or lower is preferable. It is more preferably an amorphous or low crystalline copolymer having an initial modulus of elasticity of 200 kg/cm$^2$ or lower, particularly preferably 100 kg/cm$^2$ or lower.

The ethylene-$\alpha$-olefin copolymer elastomer has a Mooney viscosity [ML 1+4 (100° C.)] of 10 to 100, preferably 20 to 80.

Examples of the ethylene-$\alpha$-olefin copolymer elastomer include ethylene-propylene copolymer rubber (EPM), ethylene-butene-1 copolymer rubber, ethylene-propylene-butene-1 copolymer rubber, ethylene-propylene-non-conjugated diene copolymer rubber (EPDM), ethylene-butene-1-non-conjugated diene copolymer rubber and ethylene-propylene-butene-1-non-conjugated diene copolymer rubber.

Of these elastomers, ethylene-propylene copolymer rubber, ethylene-propylene-non-conjugated diene copolymer rubber and ethylene-propylene-butene-1 copolymer rubber are particularly preferably used.

As the ethylene-propylene copolymer rubber, for example, a rubber containing 15 to 50% by weight of the propylene unit and having a Mooney viscosity [ML 1+4 (100° C.)] of 10 to 100, preferably 20 to 80, is preferable.

As the ethylene-propylene-non-conjugated diene rubber (EPDM) described above, a rubber having an iodine value of 20 or less is preferable. When the iodine value is out of the specified range, the coating property and balance in physical properties are inferior and the rubber is not suitable for use.

In the ethylene-propylene-butene-1 copolymer rubber described above, contents of the Components are measured by conventional methods, such as the infrared spectroscopy and the nuclear magnetic resonance method. The rubber is preferably substantially amorphous. However, it may show some degree of crystallinity. In this case, the rubber showing a crystallinity of 5% or less, preferably 4% or less, more preferably 3% or less, is effectively used. The rubber is generally used in the form of pellets but may be used in the form of a crumb or a bale so long as the mixing operation can be conducted without problem.

The polypropylene of the component (E) in an amount of 50 to 90% by weight, preferably 60 to 80% by weight, and the ethylene-α-olefin copolymer elastomer of the component (F) in an amount of 50 to 10% by weight, preferably 40 to 20% by weight, are used for compounding. The amounts are all based on the total weight of the components (E) and (F).

When the amount of the component (E) is less than 50% by weight or the amount of the component (F) is more than 50% by weight, physical properties of the resin composition, such as stiffness, are deteriorated. When the amount of the component (E) is more than 90% by weight or the amount of the component (F) is less than 10% by weight, high adhesion of the coating, layer cannot be obtained and good coating property cannot be provided. Thus, an amount out of the specified range is not preferable.

The coating property described above means a property that a coating layer formed on the surface of a molded article of a resin does not show a deteriorated condition of design, such as occurrence of peeling or blister of the coated layer, when the article is used in various environmental conditions.

The coating property which is sufficiently stable under general conditions can be exhibited by using the component (a) described above as the component (F) described above. Furthermore, when an ethylene-α-olefin copolymer elastomer showing large swelling in solvents is used in addition to the component (a), the coating property can be exhibited and the adhesion can be kept at a high level even under very severe conditions of application for a coating layer, such as the condition requiring stability against gasoline, the condition requiring recoating, and the like.

Thus, adhesion of the coating layer can further be increased when the component (F) comprises additionally an ethylene-α-olefin copolymer elastomer showing large swelling in solvents. However, when an organic solvent is additionally supplied to a coated layer by an additional coating on a layer already coated, the mixed layer is subject repenetration of the solvent because the ethylene-α-olefin copolymer elastomer showing large swelling is contained, causing decrease in adhesion and occurrence of peeling. This situation occurs, for example, in the case of the two color coating (two tone coating) on an outer panel of an automobile. The adhesion required in the case of the two color coating is evaluated by recoating property.

In other words, the recoating property is an index to evaluate the property of a coating layer to stick to the surface when the coating layer is formed additionally on the already coated surface of a molded article.

In the present invention, the ethylene-α-olefin copolymer elastomers of the components (a) and (b) are used together as the component (F) to exhibit good recoating property by achieving suitable balance between adhesion and mechanical properties, such as stiffness, impact strength, and the like.

The ethylene-α-olefin copolymer elastomer of the component (b) is preferably a copolymer containing 50 to 20% by weight, preferably 50 to 30% by weight, of the ethylene unit and having a Mooney viscosity [ML 1+4 (100° C.)] of 20 to 80, preferably 20 to 50.

The component (a) is used in an amount of 100 to 20% by weight, preferably 80 to 20% by weight, and the component (b) is used in an amount of 0 to 80% by weight, preferably 20 to 80% by weight, both based on the total weight of the component (F). When the amount of the component (b) is less than 20% by weight, adhesion of the coating layer is decreased. When the amount of the component (b) is more than 80% by weight, the recoating property is inferior.

The resin composition used for the molded article of the olefinic resin of the present invention is obtained by further adding the components (G), (H) and (I) to the components (E) and (F) contained in the amounts described above.

The modified polyolefin of the component (G) is a modified polyolefin in which a specific group is introduced to a linear polyolefin, more specifically a linear polyethylene or a linear polypropylene, at one or both ends of the molecule. It exhibits the effect of enhancing compatibility of the coating material described above with the component (F).

As the modified polyolefin, various kinds of polymers can be used. Examples of the linear polyolefin to which the specific group is introduced include a homopolymer of ethylene or propylene and a copolymer of a plurality of components. Specific examples of the linear polyolefin include polypropylene, polyethylene, and ethylene-propylene copolymer.

Number average molecular weight of the linear polyolefin part in the modified polyolefin of the component (G) is preferably 1,000 to 10,000, more preferably 2,000 to 6,000.

The group introduced into the end (one or both ends) of the linear polyolefin is a group represented by the following formula having a structure formed by addition of an aminoalcohol to maleic anhydride:

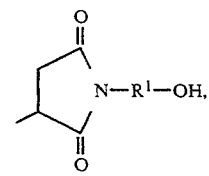

wherein $R^1$ is as previously defined.

The group described above is introduced into one or both ends of the linear polyolefin in an amount of 5 to 15% by weight. When the amount of the group is less than 5% by weight, no effect on improvement of the coating property is found.

The modified polyolefin of the component (G) is used in an amount of 1 to 15 parts by weight, preferably 1 to 10 parts by weight, based on 100 parts by weight of the total of the components (E) and (F) described above. When the amount is less than 1 part by weight, high adhesion with the coating material is not provided. When the amount is more than 15 parts by weight, mechanical properties, such as tensile strength, low temperature impact strength, and the like, are deteriorated. Thus, an amount out of the specified, range is not preferable.

The component (H) is a compound represented by one of the general formulae (I) and (II):

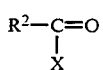  (I)

  (II)

wherein $R^2$ and X are as previously defined.

The compound represented by one of the formulae (I) and (II) has a linear alkyl group having 10 to 22 carbon atoms, such as decyl group, undecyl group and dodecyl group, and a substituent indicated by X. Preferable examples include stearic acid monoglyceride, stearyl diethanolamine, N-diethanolstearic acid amide and N-diethanoldecaneamide.

The compound of the component (H) is used in an amount of 0.01 to 2 parts by weight, preferably 0.02 to 1.0 parts by weight, based on 100 weight parts of the total of the components (E) and (F). When the amount is less than 0.01 parts by weight, high adhesion with the coating material is not provided. When the amount is more than 2 parts by weight, unfavorable phenomena, such as bleeding out during molding, are caused.

As the inorganic filler of the component (I), various materials can be used. Examples thereof include talc, titanium oxide, calcium carbonate, calcium sulfate, magnesium sulfate, calcium silicate, alumina, silica, clay, mica and quartz powder.

The inorganic filler of the component (I) is used in an amount of 0 to 15 parts by weight, preferably 0 to 10 parts by weight, based on 100 parts by weight of the total of the components (E) and (F). When the amount is more than 15 parts by weight, the impact resistance is decreased and the amount is not preferable.

In the present invention, the resin composition used as the material of the molded article of the olefinic resin comprises the components (E) to (I) described above. It may additionally comprise other additives according to necessity within the range such that the object of the present invention is not adversely affected. For example, heat stabilizer, weathering stabilizer, antistatic agent, lubricant, slipping agent, nucleating agent, flame retardant, pigment, dyestuff, glass fiber, carbon fiber, and the like additives of various kinds may be added in suitable amounts.

In the present invention, the resin composition described above can be prepared by a method similar to conventional methods of preparation of polypropylene resin compositions. The order of addition of the components (E) to (I) and various additives in the process of the preparation can be selected suitably according to desire. For mixing of the components described above, a generally known mixing apparatus, such as a kneader, rolls, a Bambury mixer, or the like, a single screw extruder, a twin screw extruder, or the like can be used.

By molding the resin composition thus obtained by a generally known method, such as injection molding, blow molding, extrusion molding, compression molding, calendar molding, rotational molding, or the like, various kinds of molded articles of the olefinic resin can be produced.

By applying the coating material which is prepared by mixing the main material containing the copolymer obtained by copolymerization of the components (A), (B) and (C) described above as the main components thereof with the curing agent to the surface of the molded article of the olefinic resin thus molded, a coated molded article of the olefinic resin can be obtained.

As the method of preparing the coating material, various kinds of method can be used. For example, a pigment, a solvent and additives are added to the copolymer (J) obtained by copolymerization of the components (A), (B) and (C) and thoroughly mixed to prepare a dispersion of the coating material (the main material) containing the copolymer as the main component thereof. Then, the dispersion of the coating material prepared here is mixed with the multi-functional isocyanate compound of the component (D) in a specified ratio. After thoroughly dispersing them by stirring, the mixture is diluted with a thinner to a viscosity of 12 to 20 seconds (20° C.) with Ford Cup No. 4 to prepare a coating material. For the preparation of the coating material, the multi-functional isocyanate compound of the component (D) can be added directly or as a solution in an ester solvent.

The objective coated molded article of the olefinic resin can be obtained by applying the coating material thus prepared to the surface of the molded article of the olefinic resin described above.

Method of the coating is not particularly limited. However, spray coating is desirable when the appearance of the coating layer is important. Thickness of the dried coating layer is generally 20 to 50 μm. The coating layer can be formed by a single coating process. After setting for 10 minutes, the coating layer is dried by heating at 70° to 120° C. for 15 to 40 minutes. In this process, the coating layer can be dried with the 1 to 3 coat and 1 to 2 baking process. It may be dried at room temperature in about 6 hours as well. However, drying by heating is more desirable in view of avoiding contamination and higher efficiency of coating.

For example, when a coating is made with metallic finishing, a molded article of metallic tone can be obtained by applying a clear coating material on a metallic base coating which is prepared according to the present invention by the wet-on-wet process. The clear coating material used here is not particularly limited but an acrylic two component urethane coating material is preferable because it is excellent in adhesion to the layer of the coating material used in the present invention as well as in other properties of the coating layer.

Furthermore, when a coating is made with pearl tone finishing, the molded article is coated with a color-base coating material which is prepared according to the present invention. Then, after a pearl-base coating material containing mica powder is coated on it, a clear coating material is coated further on it. The coating layers are dried by the 3 coat and 1 baking process or by the 3 coat and 2 baking process to obtain a molded article coated to the pearl tone. The pearl-base coating material and the clear coating material used here are not particularly limited but an acrylic two-component Urethane coating material similar to that used for the coating of metallic finishing is preferably used.

As opposed to the conventional processes which require a pretreatment of washing the surface of the molded article, more specifically washing the Surface of the molded article for degreasing with an organic solvent at room temperature or at an elevated temperature or washing the surface of the molded article with an organic solvent containing halogen, such as 1,1,1-trichloroethane or 1,1,1-trifluorotrichloroethane, according to the process of the present invention, a coating material and a resin composition each comprising specific resins are used in the process and, thereby, a coating layer having excellent finishing appearance can be obtained by a direct single coating process without washing the surface of a molded article or coating a primer as undercoat. Thus, a coated molded article of the olefinic resin excellent in adhesion, resistance to gasoline, chemical resistance, moisture resistance, weatherability and recoating property can be obtained.

Therefore, the process of coating according to the present invention can advantageously be applied to production of automobile exterior parts, such as bumper, side protective strip and fender, and the like other products. Thus, the process according to the present invention exhibits remarkable effect to increase efficiency of the coating, enhance control of the coating process, decrease production processes and curtail cost.

The invention will be understood more readily with reference to the following preparation examples, reference examples, examples and comparative examples; however, these examples are intended to illustrate the invention and are not to be construed to limit the scope of the invention thereto. Part shown in the following examples means part by weight and % means % by weight, unless otherwise noted.

Preparation Example 1

[Preparation of a component $(C_1)$]

Into a flask equipped with a stirrer, a rectifying tower, a water separation tank, a cooling tube and a thermometer, 520 parts of hexahydrophthalic anhydride and 480 parts of neopentyl glycol were charged and heated under stirring. Temperature of the mixture was increased at a constant rate in 4 hours while water formed by condensation in the temperature range of 160° to 230° C. was removed from the reaction system by distillation. After the temperature was increased to 230° C., pressure in the system was reduced and the condensation reaction was continued while the temperature was held constant.

The reaction was finished when the acid value reached 5 or lower. After cooling the reaction mixture to 80° C., 205 parts of isocyanatoethyl methacrylate was added to the system and the addition reaction was allowed to proceed for 1 hour at 80° C. under stirring to prepare a polyester prepolymer $(C_1)$ having an ethylenic double bond at the end.

The resin obtained had a number average molecular weight of 860 and a hydroxyl value of 65.

Preparation Example 2

[Preparation of a component $(C_2)$]

A polyester prepolymer $(C_2)$ was prepared by the same polymerization reaction as that in Preparation Example 1 except that 560 parts of hexahydrophthalic anhydride, 440 parts of neopentyl glycol and 105 parts of isocyanatoethyl methacrylate were used.

The resin obtained had a number average molecular weight of 1540 and a hydroxyl value of 37.

Preparation Examples 3 to 9

[Preparation of resins $(J_1$ to $J_7)$]

Into a flask equipped with a stirrer, a cooling tube and a thermometer, toluene and the components (C) and (A) were charged according to the formulation shown in Table 1 and heated to 100° C. under stirring to form a homogeneous mixture. Then, a mixed solution of the component (B) and benzoyl peroxide was dropped for 2 hours and, after the mixture was kept stirring for additional 1 hour at the same temperature, the mixture was cooled to 80° C. Then, azobisisobutyronitrile was added to the system and the mixture was stirred for 5 hours to prepare a solution of a resin (J), [one of resins $(J_1$ to $J_7)$].

Solid content (%) of the resin solution, ratio of the contents of the components, (A)/(B)/(C), (%), and hydroxyl value of the resin are shown in Table 1.

TABLE 1

| Preparation Example | 3 | 4 | 5 | 6 |
|---|---|---|---|---|
| solution of resin (J) | $J_1$ | $J_2$ | $J_3$ | $J_4$ |
| toluene | 756 | 522 | 522 | 56 |
| component C | | | | |
| kind | $C_1$ | $C_1$ | $C_2$ | $C_1$ |
| amount (part) | 400 | 100 | 100 | 300 |
| component (A) (part) | 333 | 667 | 667 | 1333 |
| chlorinated polypropylene | | | | |
| component (B) (part) | | | | |
| cyclohexyl methacrylate | 166 | 217 | 230 | 90 |
| t-butyl methacrylate | 104 | 190 | 200 | 56 |
| lauryl methacrylate | 83 | 54 | 58 | 45 |
| styrene | 62 | 82 | 97 | 34 |
| 2-hydroxyethyl acrylate | — | 152 | 120 | — |
| 2-hydroxyethyl methacrylate | 80 | — | — | 70 |
| acrylic acid | 5 | 5 | 5 | 5 |
| polymerization initiator (part) | | | | |
| benzoyl peroxide | 10 | 10 | 10 | 10 |
| azobisisobutyronitrile | 1 | 1 | 1 | 1 |
| total (part) | 2000 | 2000 | 2000 | 2000 |
| solid content of resin (J) solution (%) | 50 | 50 | 50 | 50 |
| ratio of the components (A)/(B)/(C) (%) | 10/50/40 | 20/70/10 | 20/70/10 | 40/30/30 |
| hydroxyl value of resin (J) | 60 | 80 | 60 | 50 |

| Preparation Example | 7 | 8 | 9 |
|---|---|---|---|
| solution of resin (J) | $J_5$ | $J_6$ | $J_7$ |
| toluene | 756 | 522 | — |
| component C | | | |
| kind | $C_1$ | $C_2$ | $C_1$ |
| amount (part) | 600 | 100 | 100 |
| component (A) (part) | 333 | 667 | 2000 |
| chlorinated polypropylene | | | |
| component (B) (part) | | | |
| cyclohexyl methacrylate | 100 | 267 | 86 |
| t-butyl methacrylate | 60 | 234 | 54 |
| lauryl methacrylate | 49 | 67 | 43 |
| styrene | 36 | 100 | 32 |
| 2-hydroxyethyl acrylate | — | 27 | — |
| 2-hydroxyethyl methacrylate | 50 | — | 80 |
| acrylic acid | 5 | 5 | 5 |
| polymerization initiator (part) | | | |
| benzoyl peroxide | 10 | 10 | 10 |
| azobisisobutyronitrile | 1 | 1 | 1 |
| total (part) | 2000 | 2000 | 2411 |
| solid content of resin (J) solution (%) | 50 | 50 | 42 |
| ratio of the components (A)/(B)/(C) (%) | 10/30/60 | 20/70/10 | 60/30/10 |
| hydroxyl value of resin (J) | 60 | 15 | 40 |

Reference Examples 1 to 4 and Comparative Examples 1 to 4

1. [Preparation of a coating material containing the main material of white enamel and a curing agent]

A solution of a resin (J), titanium oxide, Modaflow, xylene and butyl acetate were mixed together according to the formulation shown in Table 2. The mixture was charged into an attritor and dispersed for 4 hours to prepare the main material of white enamel.

The main material thus obtained was mixed with Duranate THA-100 (a product of Asahi Kasei Kogyo, Co., Ltd.) as the curing agent of the component (D) in a specified ratio according to Table 2. After the mixture was stirred thoroughly, it was diluted with a thinner having the composition consisting of xylene/butyl acetate=60/40 (ratio by weight) to prepare a coating material having a viscosity of 16 seconds (20° C.) with Ford Cup No. 4.

TABLE 2

| Reference Example | 1 | 2 | 3 | 4 |
|---|---|---|---|---|
| Main material solution of resin (J) | | | | |
| kind | $J_1$ | $J_2$ | $J_3$ | $J_4$ |
| amount (part) | 100 | 100 | 100 | 100 |
| titanium oxide (part) | 50 | 50 | 50 | 50 |
| Modaflow*1 (part) | 0.3 | 0.3 | 0.3 | 0.3 |
| xylene (part) | 10 | 10 | 10 | 10 |
| butyl acetate (part) | 10 | 10 | 10 | 10 |
| total (part) | 170.3 | 170.3 | 170.3 | 170.3 |
| curing agent (part) Duranate THA-100*2 | 10 | 15 | 10 | 10 |
| NCO/OH (equivalent ratio) (%) | 0.94 | 1.05 | 0.94 | 1.12 |
| Comparative Example | 1 | 2 | 3 | 4 |
| Main material solution of resin (J) | | | | |
| kind | $J_5$ | $J_6$ | $J_7$ | $J_1$ |
| amount (part) | 100 | 100 | 120 | 100 |
| titanium oxide (part) | 50 | 50 | 50 | 50 |
| Modaflow*1 (part) | 0.3 | 0.3 | 0.3 | 0.3 |
| xylene (part) | 10 | 10 | — | 10 |
| butyl acetate (part) | 10 | 10 | — | 10 |
| total (part) | 170.3 | 170.3 | 170.3 | 170.3 |
| curing agent (part) Duranate THA-100*2 | 10 | 3 | 7 | 3 |
| NCO/OH (equivalent ratio) (%) | 0.94 | 1.12 | 0.98 | 0.28 |

*1 A product of Monsanto Company; a trade name; a surface conditioner.
*2 A product of Asahi Kasei Kogyo Co., Ltd.; a trade name; content of isocyanate group, 21%.

2. [Preparation of a molded article and coating of the molded article]

| Formulation for resin compounding olefinic resin composition | |
|---|---|
| polypropylene [a product of Idemitsu Petrochemical Co., Ltd.; J-3054H, J-762-HF] | 72 parts by weight |
| EPR [a product of Japan Synthetic Rubber Co., Ltd.; EP07P] | 25 parts by weight |
| talc | 3 parts by weight |

Specified amounts of the components according to the formulation shown above were charged into a kneading extruder (a product of Nakatani Kogyo Co., Ltd.; NVC-50φ) at the same time and mixed together to prepare a polypropylene resin composition.

A molded article was prepared from the polypropylene resin composition thus obtained using a molding machine IS3000E (a product of Toshiba Kikai Co., Ltd.). The molded article prepared above was degreased with vapor of 1,1,1-trichloroethane (74° C.) for 60 seconds and dried by standing. Then, the molded article was coated with the coating material prepared above by air spraying to form a coating layer having a dried thickness of 40 μm. After the coated article was left standing in a room for 10 minutes, it was dried by heating at 80° C. for 30 minutes. Tests of properties of the coating layer were conducted after 24 hours. Results of the tests are shown in Table 3.

TABLE 3

| Reference Example | 1 | 2 | 3 | 4 |
|---|---|---|---|---|
| appearance after finishing | passed | passed | passed | passed |
| adhesion resistance to gasoline | passed | passed | passed | passed |
| condition of coated surface | passed | passed | passed | passed |
| adhesion | 100/100 | 100/100 | 100/100 | 100/100 |
| acid resistance | passed | passed | passed | passed |
| alkali resistance | passed | passed | passed | passed |
| moisture resistance | | | | |
| condition of coated surface | passed | passed | passed | passed |
| adhesion | 100/100 | 100/100 | 100/100 | 100/100 |
| weatherability | | | | |
| condition of coated surface | passed | passed | passed | passed |
| adhesion | 100/100 | 100/100 | 100/100 | 100/100 |
| Comparative Example | 1 | 2 | 3 | 4 |
| appearance after finishing | passed | passed | insufficient gloss | passed |
| adhesion resistance to gasoline | passed | passed | passed | passed |
| condition of coated surface | swelled | swelled | swelled | swelled |
| adhesion | 98/100 | 100/100 | 100/100 | 90/100 |
| acid resistance | passed | loss of gloss | passed | loss of gloss |
| alkali resistance | passed | loss of gloss | passed | loss of gloss |
| moisture resistance | | | | |
| condition of coated surface | passed | passed | passed | loss of gloss |
| adhesion | 100/100 | 100/100 | 100/100 | 100/100 |
| weatherability | | | | |
| condition of coated surface | passed | slight chalking | chalking | slight chalking |
| adhesion | 100/100 | 100/100 | 100/100 | 100/100 |

The tests of the properties were conducted according to the following methods:

1) Appearance after finishing

When the surface of a coating layer showed good gloss and no defect, such as significant rough skin, dewetting, foaming or mottling, was found, the appearance was evaluated as "passed".

2) Adhesion

The grid cellophane tape test was conducted according to Japanese Industrial Standard K-5400 (1979) 6.15 on the surfaces of a coating layer at the front face, the both sides faces, the top face and the bottom face. When no peeling of the coating layer was found, the adhesion was evaluated as "passed".

3) Resistance to gasoline

A part of a coated molded article was dipped into a regular gasoline (a product of Idemitsu Kosan Co., Ltd.; Idemitsu Red Apollo gasoline) at 20° C. for 30 minutes. After taking out the sample from the gasoline, condition of the dipped part of the coated surface was visually observed and the adhesion test was conducted. When no change was found on the coated surface, the condition was evaluated as "passed". In the adhesion test, the number of the remaining grids based on 100 original grids was counted. When the value is 100/100, the adhesion was evaluated as "passed".

4) Acid resistance

On a coated surface, 0.2 milliliter of 0.1N sulfuric acid was dropped. After the coated surface was left standing at 20° C., 75% RH (relative humidity) for 24 hours, it was washed with water. Condition of the coated surface was visually observed and, when no change was found, the coating was evaluated as "passed".

5) Alkali resistance

On a coated surface, 0.2 milliliter of 0.1N sodium hydroxide was dropped. After the coated surface was left standing at 20° C., 75% RH (relative humidity) for 24 hours, it was washed with water. Condition of the coated surface was visually observed and, when no change was found, the coating was evaluated as "passed".

6) Moisture resistance

A coated molded article was left standing in a chamber adjusted to a constant temperature of 50° C. and a constant humidity of 98% RH for 240 hours. After it was taken out of the chamber, condition of the coated surface was visually observed and the adhesion test was conducted. When no change was found on the coated surface, the condition was evaluated as "passed". In the adhesion test, the number of the remaining grids based on 100 original grids was counted. When the value is 100/100, the adhesion was evaluated as "passed".

7) Weatherability

A sample piece of 70 mm×150 mm was cut off from a coated molded article. Using a sunshine weathermeter (a product of Suga Shiken Kikai Co., Ltd.), an accelerated weathering test (black panel temperature, 63° C.; raining cycle, 12 minutes/60 minutes) was conducted with this sample piece. After the test of 1,000 hours, retention (%) [(gloss after the test/initial gloss)×100] of 60 degree mirror gloss [Japanese Industrial Standard K-5400 (1979) 6.7] was measured and the adhesion test was conducted with this sample piece.

When the retention of gloss was 80% or more and no change in color was found, the condition was evaluated as "passed". In the adhesion test, the number of the remaining grids based on 100 original grids was counted. When the value is 100/100, the adhesion was evaluated as "passed".

8) Recoating property

A sample piece of 150×300 mm was coated with the coating material prepared in Reference Example 3 as the first coating in a manner shown in FIG. 1. In this coating, thickness of the coating layer was varied from 0 to 10 μm in the direction of the longer edge. After drying the sample piece at 80° C. for 30 minutes, the second coating layer was formed (thickness of the coating layer, 40 μm) to simulate the two-tone coating.

Figure 2:
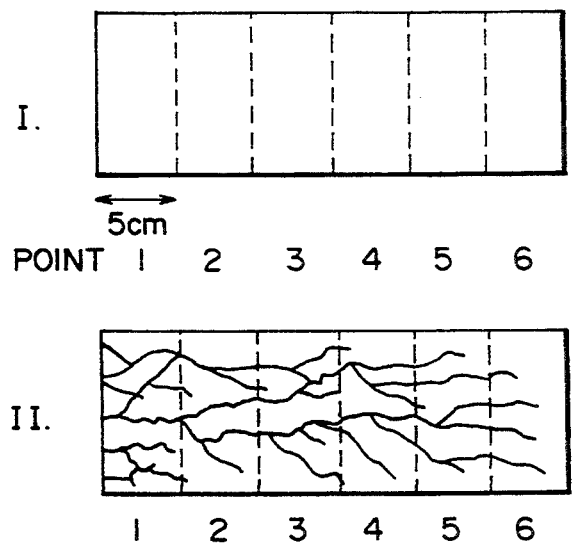
FIG. 2 is a schematic view showing the method of evaluation in the test of the recoating property.

When the recoating property is poor, the coating layer is lifted from the surface of the molded article in a cracked form at the part of smaller thickness of the first coating. Degree of the lifting was evaluated according to the criterion shown in FIG. 2. The required quality of a coating layer is point 1 or less. When the evaluation is point 2 or more, the coating layer is evaluated to be difficult for use in a coated automobile exterior part.

Examples 1 to 5 and Comparative Examples 5 to 9

Specified amounts of the components according to the formulation shown in Table 4 were charged into a kneading extruder (a product of Nakatani Kogyo Co., Ltd.; NVC-50φ) at the same time and mixed together to prepare a polypropylene: resin composition.

A molded article was prepared from the polypropylene resin composition thus obtained using a molding machine IS3000E (a product of Toshiba Kikai Co., Ltd.).

The molded article prepared above was coated with the coating material prepared in Reference Example 3 by air spraying to form a coating layer having a dried thickness of 40 μm. After the coated article was left standing in a room for 10 minutes, it was dried by heating at 80° C. for 30 minutes. Tests of properties of the coating layer were conducted after 24 hours by the same methods as those in Reference Example.

Results of the tests are shown in Table 5.

TABLE 4

| Example | 1 | 2 | 3 | 4 | 5 |
|---|---|---|---|---|---|
| composition | | | | | |
| component (E) (part) | 70 | 75 | 75 | 60 | 70 |
| component (F) | | | | | |
| EPR-1 (part) | 30 | 25 | 10 | 30 | 12 |
| EPR-2 (part) | — | — | — | — | — |
| EPR-3 (part) | — | — | 15 | 10 | 18 |
| component (G) (part) | 5 | 3 | 8 | 2 | 5 |
| component (H) (part) | 0.1 | 0.1 | 0.1 | 0.2 | 0.1 |
| component (I) (part) | 10 | 10 | 5 | 10 | 5 |

| Comparative Example | 5 | 6 | 7 | 8 | 9 |
|---|---|---|---|---|---|
| composition | | | | | |
| component (E) (part) | 70 | 93 | 75 | 60 | 70 |
| component (F) | | | | | |
| EPR-1 (part) | — | 7 | 10 | 30 | — |
| EPR-2 (part) | 30 | — | — | — | 12 |
| EPR-3 (part) | — | — | 15 | 10 | 18 |
| component (G) (part) | 5 | 5 | — | 5 | 0.5 |
| component (H) (part) | 0.1 | 0.1 | 0.1 | — | 3 |
| component (I) (part) | 10 | 10 | 5 | 10 | 5 |

The component used in Table 4 are as following:

| Component (E): | an ethylene-propylene block copolymer [J-3050H, a product of Idemitsu Petrochemical Co., Ltd.; MI = 30 g/10 minutes (230° C.)] |
|---|---|
| Component (F) | |
| EPR-1: | an ethylene-propylene rubber [$ML_{1+4}$ (100° C.) = 24; ethylene content, 74% by weight] |
| EPR-2: | an ethylene-propylene rubber [$ML_{1+4}$ (100° C.) = 27; ethylene content, 50% by weight] |
| EPR-3: | an ethylene-propylene rubber [$ML_{1+4}$ (100° C.) = 30; ethylene content, 45% by weight] |
| Component (G): | a modified polyolefin [number-average molecular weight = 4000; main chain, polypropylene; amount of the following group, 8% by weight] |

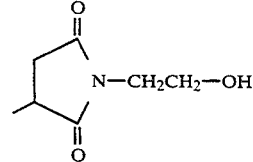

| Component (H): | stearic acid monoglyceride [Denon 2068; a product of Marubishi Yuka Kogyo Co., Ltd.] |
|---|---|

-continued

| Component (I): | talc [Asada Talc CT-76; a product of Asada Seifun Co., Ltd.] | 5 |

TABLE 5

| Example | 1 | 2 | 3 | 4 | 5 |
|---|---|---|---|---|---|
| coating property | | | | | |
| adhesion | passed | passed | passed | passed | passed |
| resistance to gasoline | | | | | |
| condition of coated surface | passed | passed | passed | passed | passed |
| adhesion | 100/100 | 100/100 | 100/100 | 100/100 | 100/100 |
| acid resistance | passed | passed | passed | passed | passed |
| alkali resistance | passed | passed | passed | passed | passed |
| moisture resistance | | | | | |
| condition of coated surface | passed | passed | passed | passed | passed |
| adhesion | 100/100 | 100/100 | 100/100 | 100/100 | 100/100 |
| recoating property | 1 | 1 | 1 | 1 | 1 |

| Comparative Example | 5 | 6 | 7 | 8 | 9 |
|---|---|---|---|---|---|
| coating property | | | | | |
| adhesion | passed | failed | passed | passed | passed |
| resistance to gasoline | | | | | |
| condition of coated surface | swelled | swelled | passed | swelled | swelled |
| adhesion | 95/100 | 50/100 | 100/100 | 100/100 | 80/100 |
| acid resistance | passed | passed | passed | passed | passed |
| alkali resistance | passed | passed | passed | passed | passed |
| moisture resistance | | | | | |
| condition of coated surface | passed | passed | passed | passed | passed |
| adhesion | 100/100 | 20/100 | 99/100 | 100/100 | 100/100 |
| recoating property | 5 | 6 | 5 | 3 | 5 |

What is claimed is:

1. A process of coating a molded article of an olefinic resin which comprises forming a finishing coating layer on the surface of a molded article of an olefinic resin comprising components (E), (F), (G), (H) and (I) with a coating material prepared by mixing the main material containing a copolymer obtained by copolymerization of components (A), (B) and (C) and having a hydroxyl value of 20 to 150 as the main component thereof with a component (D) as the curing agent in a single coating process without washing the surface of the molded article and without coating the surface of the molded article with a primer as undercoat, said components (A) to (I) being:

(A) a chlorinated polyolefin in an amount of 5 to 50% by weight of the copolymer;

(B) an acrylic monomer having hydroxyl group or a mixture thereof with an ethylenic monomer copolymerizable therewith in an amount of 5 to 80% by weight of the copolymer;

(C) a polyester prepolymer having ethylenic double bonds at the ends thereof and a number-average molecular weight of 500 to 3,000 in an amount of 1 to 50% by weight of the copolymer;

(D) a multi-functional isocyanate compound in such an amount that the equivalent ratio of the NCO group to the OH group in the copolymer (NCO-/OH) obtained from the components (A), (B) and (C) is 0.4 to 2.0;

(E) a polypropylene in an amount of 50 to 90% by weight of the total of the components (E) and (F);

(F) an ethylene-α-olefin copolymer elastomer comprising:
 (a) an ethylene-α-olefin copolymer elastomer containing 15 to 50% by weight of an α-olefin and having a Mooney viscosity [ML 1+4 (100° C.)] of 10 to 100 in an amount of 100 to 20% by weight of the component (F), and
 (b) an ethylene-α-olefin copolymer elastomer containing 50 to 80% by weight of an α-olefin and having a Mooney viscosity [ML 1+4 (100° C.)] of 20 to 80 in an amount of 0 to 80% by weight of the component (F), in an amount of 50 to 10% by weight of the total of the components (E) and (F);

(G) a modified polyolefin comprising linear polyethylene or linear polypropylene having 5 to 15% by weight of a group represented by the formula:

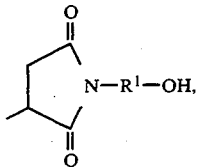

wherein R[1] indicates an alkylene group having 1 to 4 carbon atoms, introduced at one or both ends of the molecular chain, in an amount of 1 to 15 parts by weight based on 100 parts by weight of the total of the components (E) and (F);

(H) a compound represented by one of the general formulae (I) and (II):

$$R^2-\underset{X}{C}=O \qquad (I)$$

$$R^2-X, \qquad (II)$$

wherein R[2] indicates a linear alkyl group having 10 to 22 carbon atoms and X indicates the following group:

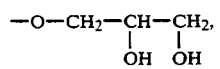

in an amount of 0.01 to 2 parts by weight based on 100 parts by weight of the total of the components (E) and (F); and (I) an inorganic filler in an amount of 0 to 15 parts by weight based on 100 parts by weight of the total of the components (E) and (F); respectively.

2. A process of coating a molded article of olefinic resin as claimed in claim 1, wherein the chlorinated polyolefin of the component (A) has a chlorine content of 10 to 50% by weight and a number average molecular weight of 3,000 to 100,000.

3. A process of coating a molded article of olefinic resin as claimed in claim 1, wherein the acrylic monomer having hydroxyl group of the component (B) is a monomer selected from the group consisting of 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and an addition product of one of these compounds with ε-caprolactone; and the ethylenic monomer copolymerizable with the acrylic monomer having hydroxyl group in the component (B) is a monomer selected from the group consisting of methyl (meth)acrylate, ethyl (meth)acrylate, propyl (meth)acrylate, butyl(meth)acrylate, 2-ethylhexyl (meth)acrylate, lauryl (meth)acrylate, cyclohexyl (meth)acrylate, glycidyl (meth)acrylate, (meth)acrylic acid, styrene, p-tert-butylstyrene, vinyltoluene, vinyl acetate and (meth)acrylates modified with acyl group.

4. A process of coating a molded article of olefinic resin as claimed in claim 1, wherein the polyester prepolymer having ethylenic double bonds at the ends thereof of the component (C) is a compound obtained by esterification of a polybasic acid and a polyhydric alcohol, followed by bringing the obtained polyester having hydroxyl groups at the ends into reaction with an ethylenically unsaturated monomer having isocyanate group or an acid anhydride having a double bond in an amount of 0.2 to 0.5 equivalent of the latter compound per 1 equivalent of the hydroxyl group of said polyester.

5. A process of coating a molded article of olefinic resin as claimed in claim 1, wherein the polypropylene of the component (E) is a polymer selected from the group consisting of isotactic propylene homopolymer having crystallinity, an ethylene-propylene random copolymer having a low content of ethylene unit, a propylene block copolymer composed of a homopolymer part which consists of propylene homopolymer and a copolymer part which consists of an ethylene-propylene random copolymer having a relatively large content of ethylene unit, and a propylene-ethylene-α-olefin copolymer in which an α-olefin is additionally copolymerized in the homopolymer part or the copolymer part of said propylene block copolymer.

6. A process of coating a molded article of olefinic resin as claimed in claim 1, wherein the ethylene-α-olefin copolymer elastomer of the component (F) is an elastomer selected from the group consisting of copolymers of ethylene and one or more α-olefins and copolymers of ethylene, one or more α-olefins and a non-conjugated diene.

7. A process of coating molded articles of olefinic resin as claimed in claim 1, wherein the molded article is used for automobile parts.

* * * * *